Oct. 12, 1943.    L. EDELMANN    2,331,542
THERMOHYDROMETER
Filed July 19, 1941    3 Sheets-Sheet 1
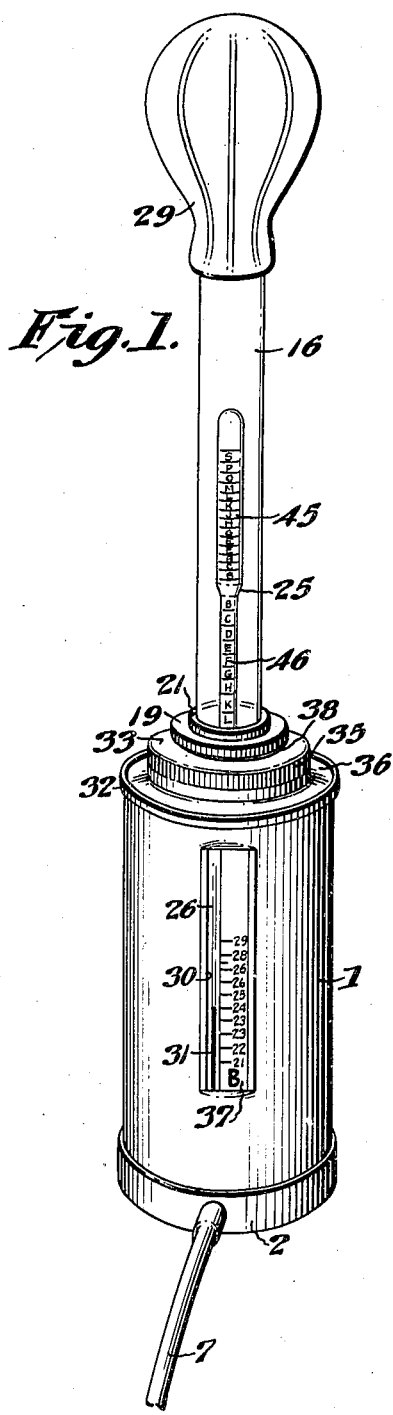
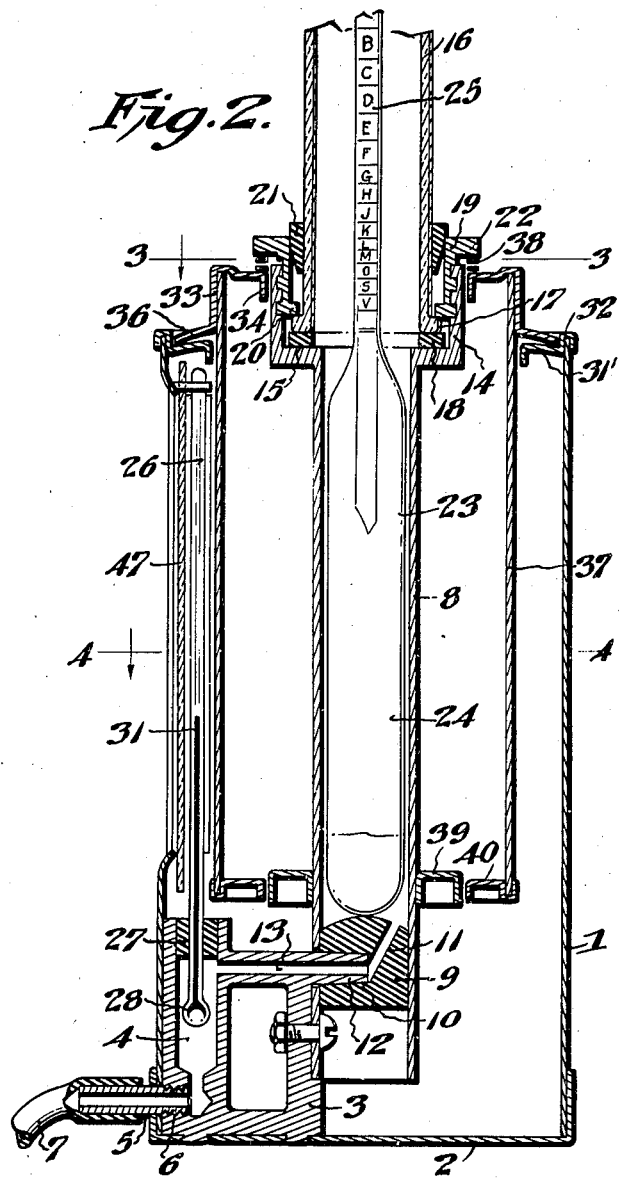
Inventor
Leo Edelmann
By Lloyd W. Patch
his Attorney Oct. 12, 1943.                L. EDELMANN                2,331,542
                            THERMOHYDROMETER
                    Filed July 19, 1941       3 Sheets-Sheet 2

Inventor
Leo Edelmann
By Lloyd W. Patch
        his Attorney

Oct. 12, 1943.  L. EDELMANN  2,331,542
THERMOHYDROMETER
Filed July 19, 1941   3 Sheets-Sheet 3
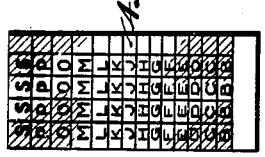
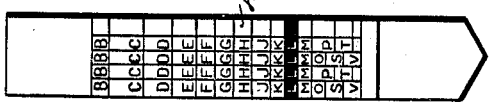
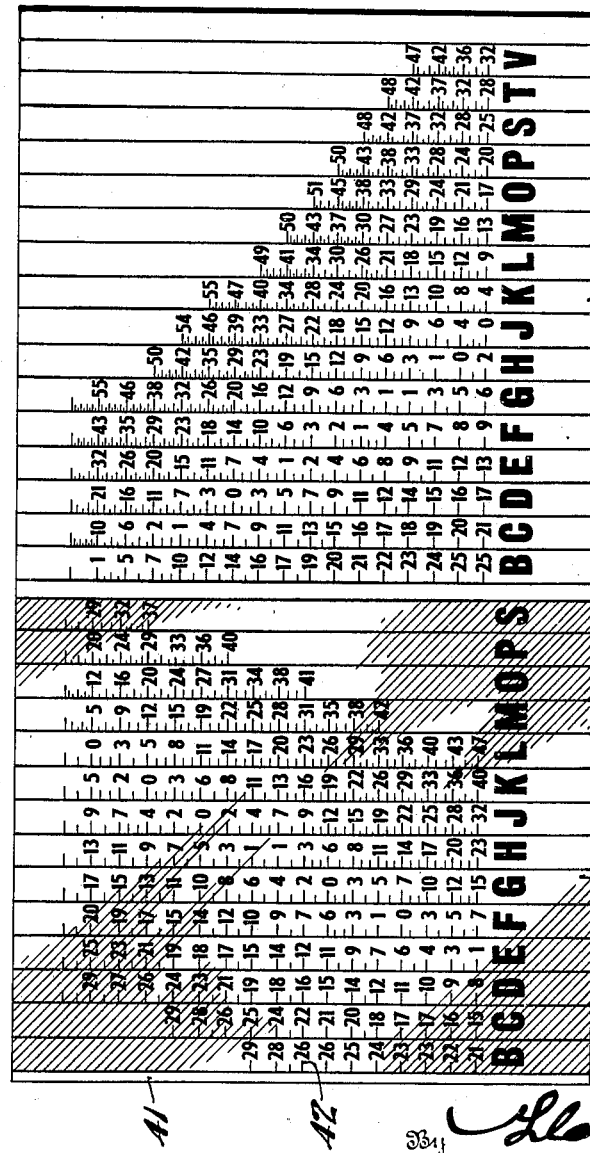
Inventor
Leo Edelmann
Lloyd W. Pateb
his Attorney Patented Oct. 12, 1943

2,331,542

UNITED STATES PATENT OFFICE 2,331,542

THERMOHYDROMETER

Leo Edelmann, Chicago, Ill.

Application July 19, 1941, Serial No. 403,217

8 Claims. (Cl. 265—46)

My invention relates to improvements in thermohydrometers, and particularly to devices of this character such as are used in testing radiator solutions, and in other connections where it is desired to obtain a reading or indication based upon specific gravity characteristics of a liquid solution at the exact temperature of the quantity of solution being tested.

The primary object of this invention is to provide an instrument that can be used without specialized skill or intricate or critical adjustments, and which will give a direct reading of specific gravity or other characteristics of the test quantity of liquid, with full compensation and correction for variations in temperature and at the exact temperature of the particular test quantity of liquid at the instant the test is being made.

Still another purpose is to so construct the instrument and the parts thereof that only a single movable part is required to be manipulated to a position or setting readily ascertained by a glance at the specific gravity indicating means and the exact information or reading or indication desired to be determined is then particularly pointed to and designated and identified by the temperature influenced means or parts.

A further object of this invention is to provide a thermohydrometer instrument of this character that can be used for testing two or more liquid solutions having different specific gravity characteristics, and with which a high degree of accuracy is attainable.

Still another purpose is to provide a thermohydrometer instrument for testing two or more solutions of different characteristics, together with indicating means taking into account specific gravity and temperature characteristics of the particular test quantity of solution, and with the parts so constructed and indicated or designated that the user will at a glance be immediately informed as to the particular float and correction or indication markings to be read for a particular solution.

With the above and other objects in view, some of which will be apparent to those skilled in the art, from a consideration of the drawings and description forming a part of this application, and others of which are inherent in the construction and assembly and manipulation and use of the parts, my invention includes certain novel features of construction and combinations and arrangements of various parts which will be hereinafter set forth in connection with the drawings, and then pointed out in the claims.

In the drawings:

Figure 1 is a view in perspective showing an adaptation of my invention in a thermohydrometer.

Fig. 2 is an enlarged vertical sectional view through the lower part of the instrument cut substantially at right angles to the showing in Figure 1.

Fig. 7 is a flattened out elevational view showing the correction or indicating or data chart or sheet.

Fig. 8 is a flattened out view showing the upper indicating scale of the hydrometer float element.

Fig. 9 is a view similar to Fig. 8 showing the lower scale of the float element.

Figure 3:
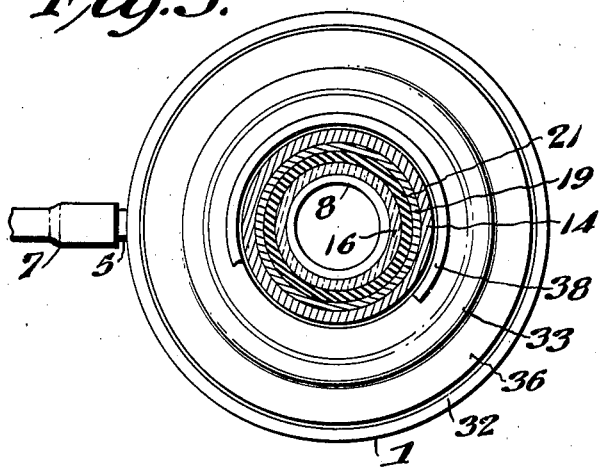
Fig. 3 is a horizontal sectional view taken substantially on line 3—3 of Fig. 2.
Figure 6:
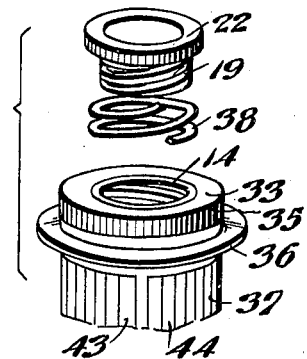
Fig. 6 is a fragmentary disassembled and grouped perspective view of the indicating cylinder and retaining parts therefor.
Figure 4:
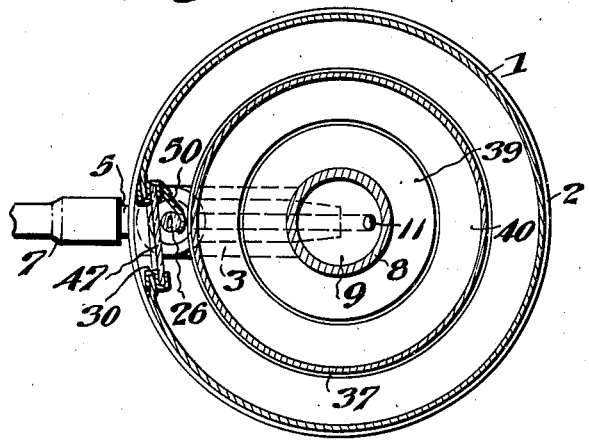
Fig. 4 is a similar view substantially on line 4—4 of Fig. 2.

An outer case 1, which is perhaps preferably a substantially cylindrical tube, has a bottom closure member 2, and a supporting base member 3 is mounted within the casing structure as thus provided. This supporting base member has a liquid chamber 4 cast, cored, bored, or otherwise formed therein, and a liquid inlet nipple 5 is turned into a threaded opening 6 communicating with this liquid chamber 4, or is otherwise assembled with its outer end available to receive a liquid suction and discharge hose or tube or nozzle 7.

The supporting base member has a float housing tubular member 8 mounted and supported thereon and extending upwardly substantially axially within the case 1. A closure plug 9, of rubber or other suitable material, is mounted within the housing 8 adjacent the lower end thereof and is provided with a connecting opening 10 having a liquid passage 11 extending therefrom to open through the top of the plug into communication with the interior of the housing tube 8. The supporting base member 3 is provided with a connecting nipple 12 which has a passageway 13 extending therefrom and communicating with the liquid chamber 4 at a point upward from the bottom thereof.

A connecting sleeve 14 of relatively larger diameter than the housing tube 8 is carried at the upper end thereof by an intermediate flat shoulder portion 15, and this connecting sleeve is internally screw threaded. A liquid and float receiving barrel 16, of glass or other suitable transparent material through which float indications can be read, is preferably made of an internal diameter slightly greater than the tubular housing 8, and at its lower end is provided with an outwardly extending annular bead 17. A packing washer or gasket 18 is interposed between the end of the barrel 16 and the shoulder 15, and an annular clamp ring 19 having a sleeve portion thereof externally screw threaded to fit the screw threads of the connecting sleeve 14 is turned into this connecting sleeve 14 around the lower end of the barrel 16. This annular connecting nut 19 has at its lower end an inturned flange 20 which will bear against the outturned bead portion 17 of the liquid barrel 16 and will clamp the gasket 18 in liquid-tight packing between the shoulder 15 and the end of the liquid barrel 16. The transparent liquid barrel 16 will ordinarily be made of glass or other frangible material, and a cushion ring 21, of soft cushion rubber or other suitable material, and having its lower part of tapered thickness, is forced into the space between the liquid barrel 16 and the bore of the clamp nut 19 adjacent to its outer end. The annular packing nut 19 has an outwardly disposed flange portion 22 around its upper end, and this flange portion is preferably knurled or milled on its outer peripheral face so that it can be better grasped and held for manual tightening and loosening.

With the parts constructed and assembled in the manner set forth, the transparent barrel portion 16 is assembled substantially axially above and in liquid-tight connection with the tubular float housing 8, and the connecting nipple portion 12 establishes direct communication from the liquid chamber 4 to the interior of the housing 8 and the transparent barrel 16. A float element 23 has the bulb portion 24 thereof made of a diameter to permit free and unrestricted movement axially within the housing portion 8, and yet the fit is sufficiently close that the float element 23 will be held against and prevented from tilting so that the indicating stem 25 thereof will not come into contact with the transparent barrel 16. The plug 9 is preferably crowned on its upper end and with the opening of the passage 11 at one side away from the center the float element 23 can come to a cushioned rest upon the plug 9 and the opening of the passage 11 will be completely unobstructed at all times.

A thermometer 26, here shown as being of the capillary tube type, has the tube thereof fitted through a plug 27, of rubber or other suitable material, and this plug is inserted and fitted into the upper end of the bore forming the liquid chamber 4 so that the chamber is closed or sealed except for the liquid openings through passage 13 and through nipple 5. In this mounting, the temperature influenced or responsive bulb portion 28 of the thermometer 26 is disposed substantially centrally within the chamber 4 intermediate the passage 13 and the nipple 5, and consequently this portion will be directly exposed to and subjected to and will be influenced by the temperature of a test quantity of liquid drawn into the tubular housing 8 and the barrel 16, through the nozzle 7, nipple 5, chamber 4, passage 13, and passage 11. To create the desired suction to draw the test quantity of liquid into the instrument, a suction bulb 29 is here illustrated as being mounted at the upper end of the barrel 16.

So that the indicating portion of the thermometer 26 can be viewed by the user, I provide an opening 30 through one side of the tubular casing portion 1, and the indicating column 31 of the thermometer is freely and clearly visible through this opening 30.

The tubular casing 1 has an inwardly projecting or extending flange portion 31' carried at the top thereof, and it is perhaps preferable that an upstanding rim flange be provided at 32. A setting knob 33 is provided with a central opening of sufficient size to revolubly fit over and receive the connecting sleeve portion 14, a bearing flange being preferably provided at 34. Further, this setting knob 33, which is preferably knurled or milled or otherwise roughened to facilitate grasping and rotation, as shown at 35, has an outwardly extending skirt flange 36 adapted to fit and bear at its outer under side against the top of the flange 31' and within the upstanding flange portion 32. A data carrying and display sleeve 37, of substantially tubular formation, depends from the setting knob 33 within the casing 1 to be thus rotatably disposed with its surface exposed to be viewed through the opening 30, in which a part of the surface will be framed immediately adjacent to the indicating portion of the thermometer 26 and the indicating column 31 thereof. A coil spring 38 is preferably disposed between the under side of the shoulder 22 of the annular clamp nut 19 and the top of the setting knob 33 so that the flange portion 36 will be held in frictional contact with the flange portion 31' of the casing 1, and this mounting serves to retain the tubular scale or indicia display portion 37 in predetermined depending relation and against shifting or movement axially. At the same time, the frictional engagement of the flange portions 36 and 31' will hold the setting knob 33 and the sleeve 37 against casual and accidental rotational displacement from desired and adjusted settings.

To further insure against shifting or twisting movement of the tubular portion 37 that might lead to inaccurate results, a bearing portion 39 is mounted around the float housing member 8 and a bearing flange 40 disposed inwardly at the lower extremity of the tubular portion 37 is revolubly centered by this bearing 39.

The sleeve portion 37 has on the outer face or surface thereof markings or indicia of the character shown in Fig. 7, and here there are two separate scales, and in the present instance I have shown this as a sheet 41 to be adhesively or otherwise secured upon the outer surface of the depending and revoluble sleeve 37, with the horizontal indications or markings at 42 disposed in predetermined relation with respect to the particular thermometer 26 and the indicating column 31 thereof. Obviously, the markings can be printed, lithographed, or can be otherwise directly applied to or can be placed or displayed upon the sleeve 37 in any desired and approved manner. In the present instance I have shown two scales, as indicated at 43 and 44, and for illustration the scale 43 can be taken as a scale for use with antifreeze solutions containing methanol, and the scale indications at 44 can be taken as suitable for use with an antifreeze solution containing ethylene glycol, which antifreeze liquid is sold as "Prestone" and under other brand names. As methanol solutions are lighter than water and ethylene glycol solutions are heavier than water, it is necessary that the indicating stem 25 of the specific gravity float element 23 carry separate scales, as indicated at 45 and 46, these scales 45 and 46 suitable for use with the charts or data 43 and 44 respectively being shown as flattened out in Figs. 8 and 9.

To protect the parts within the casing 1, it is perhaps preferable that a piece of transparent material 47 be mounted over the viewing opening 30, and in the present instance I have shown this transparent member 47 as mounted behind the opening and held in place by clips 48 and 49, and with a shield member 50 extending behind the indicating portion of the thermometer 26 so that the indications on the cylinder 37 immediately behind the thermometer will not be visible to obscure or confuse a reading of the indicating column 31.

In the use of my improved instrument, the nozzle 7 has its end inserted into the liquid to be tested, and as the suction bulb 29 is squeezed and then released the liquid will be drawn through the nozzle 7 and nipple 5 into the liquid chamber 4 where the temperature influenced bulb 28 of the thermometer 26 will be completely submerged in the liquid and will be affected by the temperature of the test quantity of liquid. The suction draws the liquid through the liquid chamber 4 and passages 13 and 11 and into the float housing 8 and the liquid barrel 16 to a sufficient height for flotation of the float element 23 so that a test for specific gravity reading or indication can be taken.

Assuming that a test is being made of a radiator solution containing methanol, the scale 45 on the indicating stem 25 of the float element 23 will be used, and assuming that the element rides or floats with the liquid level on the indication B, the setting dial 33 is manipulated to revolve the sleeve 37 so that the column "B" of the scale 43 is exposed through the window opening of the case 1, immediately adjacent to the indicating portion of the thermometer 26, as illustrated in Figure 1. Then, a direct reading can be taken of the figure or indication immediately in line with the top of the indicating column 31, and as in the present instance and with the markings on the scale in freezing temperatures of a particular methanol antifreeze solution as used in an automobile radiator, this direct reading shows that the particular solution will freeze at 24 degrees above zero, Fahrenheit. Should the specific gravity element 23 float or ride with the liquid level at J on the upper scale, it is only necessary to rotate the setting knob 33 so that the sleeve 37 will be revolved to expose the letter "J" at the lower end of the window opening 30, and then the indications for the particular strength of solution will be presented to be read directly in line with the top of the indicating column 31. In viewing the figures in the column "J" it will be noted that zero point is shown with some figures indicating temperatures above and others below zero Fahrenheit, and in actual practice it has been found desirable and advantageous to print figures below zero in a distinctive color, as for example with the figures above zero shown in black and with the figures below zero printed or otherwise shown in red.

In some instances it will be seen that the figures as printed on the chart are not consecutive, but that the space is hardly sufficient for showing of all numerals in chronological order; and, a study of the chart markings will show that where the divisions the thus small these have been marked off intermediate the number divisions and in consequence a very accurate and close reading chart is provided with the user able to read in exact consecutive degrees and with greater accuracy than with thermohydrometers as heretofore constructed and available.

As indicated by the lining on the charts 43 and 45, the corresponding indicating portions of the float element and on the sleeve 37 can be distinctively colored, as for example in shades or tints of yellow, pink, green, or can be otherwise designated so that the user will immediately distinguish and know just what part of the data carried by the sleeve 37 should be brought into view for the particular effective portion of the float element. In the present instance the instrument is available for testing solutions of opposite characteristics, and if the scales 44 and 46 be shown on a white background and the scales 43 and 45 be shown on a correspondingly colored background, the user will have immediately and instantly indication of the correction scales to be used one against the other. Also, with this instrument the indicating portion 25 of the float element is in the same field of vision with the indicating column 31 and the exposed part of the cylinder 37, and consequently quick and accurate readings can be taken and there will be no possibility of confusion due to necessity for noting two or more different indications and then cross reading the one against the other. On the contrary, it is only necessary that the user note the particular letter or designation on the float stem 25 at the liquid level within the transparent barrel 16, and then by rotating the knob 33 and consequently the sleeve 37 to expose the same designating chart at the bottom of the window opening 30 the effective figures or indications are immediately available directly adjacent to the top of the liquid column 31 so that direct readings can be taken.

Figure 10:
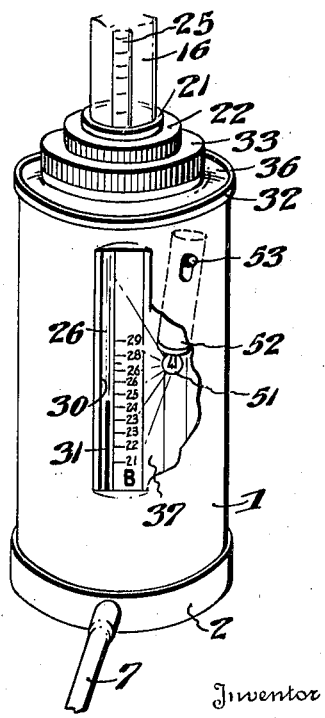
Fig. 10 is a fragmentary sectional view of the lower part of a modified construction of instrument.
Figure 5:
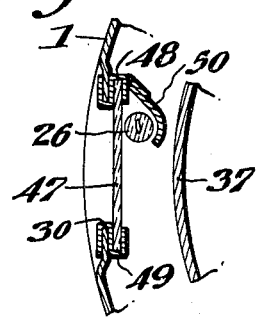
Fig. 5 is an enlarged fragmentary sectional view to better show the parts illustrated in Fig. 4.

While the gauge stem 25 of the float element will ordinarily be readily visible due to the transparency of the liquid barrel 16, in some places and uses it may be found desirable to provide illumination for the indicating portions of the thermometer and for the effective indications or data on the sleeve 37 as disposed for viewing through the opening 30, and in Fig. 10 I have shown a modified construction in which a light bulb 51 is disposed within the casing 1 and one side of the opening 30 so that the light rays therefrom will illuminate the indicating portion of the thermometer 26 and that side of the sleeve 37 visible through the opening 30, for better reading of the particular figure or designation on the sleeve 37 as designated by the indicating column 31. This light bulb can be conveniently supplied with current from cells or batteries within a casing 52, and can be controlled by any suitable switch or other means 53.

The showing in Fig. 10 is intended to be only illustrative, and it will be appreciated that lighting structure to illuminate parts shown through the opening 30 can be constructed and embodied in many different ways.

With the parts constructed in the manner set forth the sleeve 37 can have more than two separate charts printed or shown thereon, and if greater peripheral area be required this can be readily accomplished by increasing the diameter of the parts, still without enlarging the casing to a point of being clumsy or objectionable. Further, the outer surface of the casing 1 being of smooth cylindrical form, offers a usable and very convenient space for printing or displaying advertising or radiator capacity charts, or in fact any matter that it may be desired to display.

While I have herein shown and described only certain specific embodiments and adaptations of my invention, for particular liquid solutions, and have suggested only certain possible modifications in form and use, it will be appreciated that many changes and variations can be made in the form, construction, and arrangements of the parts, and in the manner of associating and using the same, without departing from the spirit and scope of my invention.

I claim:

1. A thermohydrometer comprising a liquid and float barrel structure, a cylindrical casing, a supporting base member within said casing having a test liquid intake and discharge passage communicating with the liquid and float barrel, said casing having an opening through one side thereof, a thermometer carried by said supporting base member having a temperature influenced portion thereof in the liquid passage and having an indicating portion disposed to be visible through the opening of the casing, and a cylindrical correction scale carrying sleeve revoluble within the casing and with a portion of the surface thereof exposed to be viewed through the opening of the casing and back of the indicating portion of the thermometer.

2. A thermohydrometer comprising a liquid and float barrel structure, a cylindrical casing, a supporting base member within said casing having a test liquid intake and discharge passage communicating with the liquid and float barrel, said casing having an opening through one side thereof, a thermometer carried by said supporting base member having a temperature influenced portion thereof in the liquid passage and having an indicating portion disposed to be visible through the opening of the casing, a cylindrical correction scale carrying sleeve revoluble within the casing and with a portion of the surface thereof exposed to be viewed through the opening of the casing and back of the indicating portion of the thermometer, and a float element in the liquid and float receiving barrel having indications thereon, said cylindrical sleeve having data thereon disposed in columns extending substantially parallel with the thermometer tube and designated by indications corresponding to indications on the float element.

3. A thermohydrometer comprising a liquid and float barrel structure, a cylindrical casing, a supporting base member within said casing having a test liquid intake and discharge passage communicating with the liquid and float barrel, said casing having an opening through one side thereof, a thermometer carried by said supporting base member having a temperature influenced portion thereof in the liquid passage and having an indicating portion disposed to be visible through the opening of the casing, a cylindrical correction scale carrying sleeve revoluble within the casing and with a portion of the surface thereof exposed to be viewed through the opening of the casing and back of the indicating portion of the thermometer, a float element in the liquid and float receiving barrel having indications thereon, said cylindrical sleeve having data thereon disposed in columns extending substantially parallel with the thermometer tube and designated by indications corresponding to indications on the float element, and means for manually rotating said cylinder to bring desired data thereon adjacent to the indicating portion of the thermometer.

4. A thermohydrometer comprising a liquid and float barrel structure, a cylindrical casing, a supporting base member within said casing having a test liquid intake and discharge passage communicating with the liquid and float barrel, said casing having an opening through one side thereof, a thermometer carried by said supporting base member having a temperature influenced portion thereof in the liquid passage and having an indicating portion disposed to be visible through the opening of the casing, a cylindrical correction scale carrying sleeve revoluble within the casing and with a portion of the surface thereof exposed to be viewed through the opening of the casing and back of the indicating portion of the thermometer, and a float element in the liquid and float receiving barrel having indications thereon, said cylindrical sleeve having data thereon disposed in columns extending substantially parallel with the thermometer tube and designated by indications corresponding to indications on the float element, said float element being constructed for testing liquid solutions of different characteristics and having the indicating portion thereof divided into scale portions relating to each liquid solution and the cylindrical sleeve being provided with separate correction scale portions for each particular solution, and characteristics identifying the particular scale on the float element to be used with the particular scale on the cylindrical sleeve.

5. A thermo-correcting hydrometer comprising a liquid and float receiving barrel, a float element in said barrel having gauge indicating markings thereon, means to draw a test quantity of liquid into said barrel, a thermometer having a temperature responsive portion exposed to the temperature of the test quantity of liquid and having an indicating tube portion extending in upright relation, indicating scale carrying means movable transversely in a fixed path back of and adjacent to the thermometer tube and having temperature corrected indications thereon in a plurality of columns extending substantially parallel with the upright indicating portion of the thermometer, said indicating scale carrying means having the upright vertical columns thereof marked to correspond with indications of the float element and having the indications of each column calibrated to a condition of the test quantity of liquid at the particular indication of the float and at various temperatures of the solution whereby when said scale carrying means is moved to bring a particular column thereon as indicated by the float reading adjacent to the thermometer tube a direct reading can be taken of the indication in this column as directly designated at the top of the indicating column of the thermometer.

6. A thermo-correcting hydrometer comprising a liquid and float receiving barrel having a base at the lower end thereof, means to draw a test quantity of liquid through said base into said barrel, a float element in said barrel having a gauge stem provided with indicating markings, a thermometer carried by said base with a temperature influenced portion exposed to the temperature of a test quantity of liquid and having an indicating tube extending upwardly alongside of and spaced from said liquid barrel with an indicating column in said tube, an indicating scale carrying member movable behind and substantially transversely with respect to the upstanding tube of the thermometer having the indicating column therein, said scale carrying member having data thereon in vertical and horizontal columnar relation and having the vertical columns designated to correspond with indications on the gauge stem of the float element and having indications in such vertical columns calibrated to be read directly and immediately transversely from the indicating portion of the thermometer to give a reading corrected to a temperature resulting in the immediate height of the indicating column of the thermometer with the particular float element reading.

7. A thermo-correcting hydrometer comprising a liquid and float receiving barrel, a float element in said barrel having a gauge stem marked with indications, means to draw a test quantity of liquid into said liquid and float barrel, a thermometer having a portion exposed to be influenced by the temperature of the test quantity of liquid and having an upstanding indicating tube with an indicating column therein, a cylindrical sleeve revoluble back of and adjacent to the indicating tube of the thermometer having thereon correction data arranged in vertical columns corresponding to and designated by indications of the scale of the float element and with the indications at each elevation within the column calibrated to temperature corrections for particular temperatures of the test quantity of liquid when the indicating column of the thermometer tube is at a transversely level position and consequently pointing to such corrected data.

8. A thermo-correcting hydrometer comprising an upright liquid and float receiving barrel structure, a specific gravity float in said barrel having a gauge stem provided with indicating markings, means to draw a test quantity of liquid into said liquid and float receiving barrel, a thermometer having a temperature influenced portion exposed to the temperature of a test quantity of liquid as taken into said barrel and having an upstanding indicating tube provided with a temperature responsive indicating column, a cylindrical sleeve housing around said barrel and thermometer having an upright opening through which the indicating portion of said thermometer is visible, and a cylindrical sleeve revoluble within said housing around said barrel and with the outer face thereof back of the thermometer indicating tube whereby said sleeve is settable to bring a portion thereof alongside of the indicating tube of the thermometer to be viewed through the opening of the housing adjacent to the indicating column, said revoluble cylindrical sleeve having on the outer side thereof a plurality of columns of indications with each column designated according to an indicating marking on the float gauge stem and with the indications of each column calibrated to compensate for temperature characteristics of the test quantity of liquid at a liquid temperature as designated by the top of the indicating column.

LEO EDELMANN.